(12) United States Patent
Takuma et al.

(10) Patent No.: US 12,111,868 B2
(45) Date of Patent: Oct. 8, 2024

(54) SUGGESTING QUERY TERMS

(71) Applicant: INTERNATIONAL BUSINESS MACHINES CORPORATION, Armonk, NY (US)

(72) Inventors: Daisuke Takuma, Toshima-ku (JP); Noriyuki Ikawa, Koganei (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 318 days.

(21) Appl. No.: 17/474,456

(22) Filed: Sep. 14, 2021

(65) Prior Publication Data

US 2023/0083598 A1 Mar. 16, 2023

(51) Int. Cl.
*G06F 16/9032* (2019.01)
(52) U.S. Cl.
CPC ............... *G06F 16/90324* (2019.01)
(58) Field of Classification Search
CPC ........... G06F 16/90324; G06F 16/9038; G06F 16/9532; H04L 51/04; H04L 51/046; H04L 51/52
See application file for complete search history.

(56) References Cited

U.S. PATENT DOCUMENTS 6,006,225 A 12/1999 Bowman et al.
9,286,391 B1 * 3/2016 Dykstra ............... G06F 16/285
2009/0037399 A1 * 2/2009 Bartz ................ G06F 16/36
   707/999.005
2015/0106157 A1 * 4/2015 Chang ................ G06F 40/237
   705/7.29
2018/0349401 A1 * 12/2018 Ikawa ................ G06F 16/438

OTHER PUBLICATIONS

Chen, Wanyu, et al. "Attention-based Hierarchical Neural Query Suggestion", arXiv:1805.02816v1. May, 8, 2018, pp. 1-4.
Fan, Ju, et al. "Suggesting Topic-Based Query Terms as You Type", 2010 12th International Asia-Pacific Web Conference, IEEE Computer Society. Apr. 6, 2010, pp. 61-67.
Anagnostopoulos, Ioannis, et al. "Semantic query suggestion using Twitter Entities", Neurocomputing, www.elsevier.com/locate/neucom. Mar. 21, 2015, pp. 137-150.

(Continued)

*Primary Examiner* — Taelor Kim
(74) *Attorney, Agent, or Firm* — Tutunjian & Bitetto, P.C.; Robert Richard Aragona

(57) ABSTRACT

A computer-implemented method is provided for suggesting a query term. The method includes obtaining a seed term and a candidate term. The method further includes retrieving two nodes indicating the seed term and the candidate term respectively from a semi-structured corpora. The method also includes determining, by a processor device, whether the candidate term includes details of information on the seed term based on a positional relation between the two nodes in the semi-structured corpora. The method additionally includes suggesting the candidate term as an additional query term in response to a positive determination. The method further includes performing the query with the candidate term as the additional query term in response to a suggestion of use acceptance to enhance query answer retrieval results.

20 Claims, 11 Drawing Sheets

(56) References Cited

OTHER PUBLICATIONS

Lopez, Alejandro Perez. "Improving Search Suggestions for eCommerce", Medium, Empathy.co, https://medium.com/empathyco/improving-search-suggestions-for-ecommerce-cb1bc2946021. Sep. 27, 2018, pp. 1-6.
Song, Yang, et al. "Query suggestion by constructing term-transition graphs", Proceedings of the Fifth International Conference on Web Search and Web Data Mining, WSDM 2012. Feb. 2012, pp. 1-10.
Verberne, Suzan, et al. "Query term suggestion in academic search", European Conference on Information Retrieval. Apr. 2014, pp. 1-6.
Smith, Fabrizio, et al. "Semantics-based Expansion of Search Queries Enforcing Lateral Thinking", WEB 2015, Rome. May 2015, pp. 1-6.
Mell et al., "The NIST Definition of Cloud Computing", National Institute of Standards and Technology, Special Publication 800-145. Sep. 2011, pp. 1-7.

* cited by examiner

800

```
<div>
<li>
<span class="cap1">Tire</span>
</li>
<li>
<p>... blowout ... stolen ... </p>
</li>
</div>
<li>
<span class="cap1">Windshield</span>
</li>
<li>
<p>... crack ... broken ... replaced ...
... stone ... </p>
</li>
</div>
```

FIG. 8

SUGGESTING QUERY TERMS

BACKGROUND

The present invention generally relates to querying, and more particularly to suggesting query terms.

Query suggestion helps a user of a search engine to improve their search query. A typical implementation of the function is using the relationship between terms appearing together in a search log record or its content data. In case it is used in an enterprise, however, the content data varies so quickly that the search log does not include sufficient information of term relationship. Using the term correlation in the content data also has drawbacks of not having information of search orders. For example, "car insurance" is suggested for a query "windshield" though "car insurance" is too trivial for users searching for "windshield". Hence, there is a need for an improved method for suggesting query terms.

SUMMARY

According to aspects of the present invention, a computer-implemented method is provided for suggesting a query term. The method includes obtaining a seed term and a candidate term. The method further includes retrieving two nodes indicating the seed term and the candidate term respectively from a semi-structured corpora. The method also includes determining, by a processor device, whether the candidate term includes details of information on the seed term based on a positional relation between the two nodes in the semi-structured corpora. The method additionally includes suggesting the candidate term as an additional query term in response to a positive determination. The method further includes performing the query with the candidate term as the additional query term in response to a suggestion of use acceptance to enhance query answer retrieval results.

According to other aspects of the present invention, a computer program product is provided for suggesting a query term. The computer program product includes a non-transitory computer readable storage medium having program instructions embodied therewith. The program instructions are executable by a computer to cause the computer to perform a method. The method includes obtaining, by a processor device, a seed term and a candidate term. The method further includes retrieving, by the processor device, two nodes indicating the seed term and the candidate term respectively from a semi-structured corpora. The method also includes determining, by the processor device, whether the candidate term includes details of information on the seed term based on a positional relation between the two nodes in the semi-structured corpora. The method additionally includes suggesting, by the processor device, the candidate term as an additional query term in response to a positive determination. The method further includes performing, by the processor device, the query with the candidate term as the additional query term in response to a suggestion of use acceptance to enhance query answer retrieval results.

According to yet other aspects, a computer processing system is provided for suggesting a query term. The computer processing system includes a memory device for storing program code. The computer processor system further includes a processor device operatively coupled to the memory device for storing program code to obtain a seed term and a candidate term. The processor device further runs the program code to retrieve two nodes indicating the seed term and the candidate term respectively from a semi-structured corpora. The processor device also runs the program code to determine whether the candidate term includes details of information on the seed term based on a positional relation between the two nodes in the semi-structured corpora. The processor device additionally runs the program code to suggest the candidate term as an additional query term in response to a positive determination. The processor device further runs the program code to perform the query with the candidate term as the additional query term in response to a suggestion of use acceptance to enhance query answer retrieval results.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein:

FIG. 8 is a diagram showing an exemplary portion of HTML code, in accordance with an embodiment of the present invention;

DETAILED DESCRIPTION

Embodiments of the present invention are directed to suggesting query terms.

Embodiments of the present invention use semi-structured corpora to restrict the search order of two terms from the relationship between corpus nodes including each of the two terms. In a simple example, the relationship between one of the two nodes and the other of the two nodes can be a sub-node relationship.

As an example, the present invention can involve the following, given a term pair A and B (seed and suggestion):
(1) Retrieve nodes $N_A$ and $N_B$ respectively including A and B from the corpora, where $N_X=\{$nodes including a term X$\}$
(2) Load the configuration of a positional restriction R on the two nodes $N_A$ and $N_B$.
Positional restriction R maps $(n_A, n_B) \in N_A \times N_B$ to its score$\in[0,1]$.
The score represents the likelihood of the node np including the details of the information in $n_a$.
(3) Determine the confidence of B according to the scores.

Each corpus is organized in the shape of a tree-like structure. These trees are constructed with the use of corpus nodes. A corpus node is a specific point inside the structure of the corpus, and it is used to build its general structure. Usually corpus nodes are grouped together on the basis of, e.g., the geographical location, the discourse genre, the gender or age of the speakers, the dialect of the speakers, the target/source language etc. Here, the present invention exploits positional information in the corpus to suggest query terms.

Figure 1:
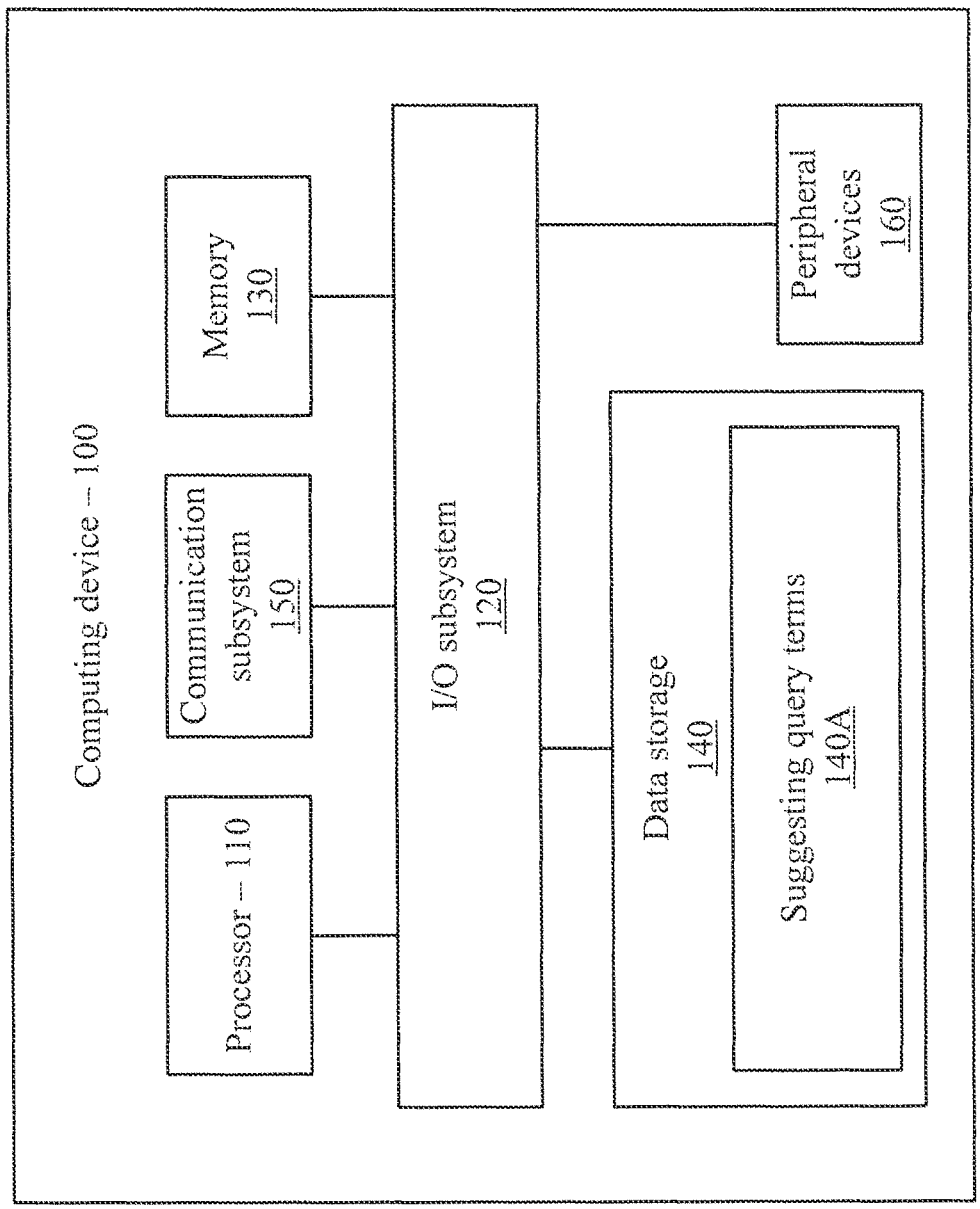
FIG. 1 is a block diagram showing an exemplary computing device, in accordance with an embodiment of the present invention.

FIG. 1 is a block diagram showing an exemplary computing device 100, in accordance with an embodiment of the present invention. The computing device 100 is configured to suggest query terms.

The computing device 100 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 100 may be embodied as a one or more compute sleds, memory sleds, or other racks, sleds, computing chassis, or other components of a physically disaggregated computing device. As shown in FIG. 1, the computing device 100 illustratively includes the processor 110, an input/output subsystem 120, a memory 130, a data storage device 140, and a communication subsystem 150, and/or other components and devices commonly found in a server or similar computing device. Of course, the computing device 100 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 130, or portions thereof, may be incorporated in the processor 110 in some embodiments.

The processor 110 may be embodied as any type of processor capable of performing the functions described herein. The processor 110 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 130 may be embodied as any type of volatile or non-volatile memory or data storage capable of performing the functions described herein. In operation, the memory 130 may store various data and software used during operation of the computing device 100, such as operating systems, applications, programs, libraries, and drivers. The memory 130 is communicatively coupled to the processor 110 via the I/O subsystem 120, which may be embodied as circuitry and/or components to facilitate input/output operations with the processor 110 the memory 130, and other components of the computing device 100. For example, the I/O subsystem 120 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.) and/or other components and subsystems to facilitate the input/output operations. In some embodiments, the I/O subsystem 120 may form a portion of a system-on-a-chip (SOC) and be incorporated, along with the processor 110, the memory 130, and other components of the computing device 100, on a single integrated circuit chip.

The data storage device 140 may be embodied as any type of device or devices configured for short-term or long-term storage of data such as, for example, memory devices and circuits, memory cards, hard disk drives, solid state drives, or other data storage devices. The data storage device 140 can store program code for suggesting query terms. The communication subsystem 150 of the computing device 100 may be embodied as any network interface controller or other communication circuit, device, or collection thereof, capable of enabling communications between the computing device 100 and other remote devices over a network. The communication subsystem 150 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 100 may also include one or more peripheral devices 160. The peripheral devices 160 may include any number of additional input/output devices, interface devices, and/or other peripheral devices. For example, in some embodiments, the peripheral devices 160 may include a display, touch screen, graphics circuitry, keyboard, mouse, speaker system, microphone, network interface, and/or other input/output devices, interface devices, and/or peripheral devices.

Of course, the computing device 100 may also include other elements (not shown), as readily contemplated by one of skill in the art, as well as omit certain elements. For example, various other input devices and/or output devices can be included in computing device 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. Further, in another embodiment, a cloud configuration can be used (e.g., see FIGS. 10-11). These and other variations of the processing system 100 are readily contemplated by one of ordinary skill in the art given the teachings of the present invention provided herein.

As employed herein, the term "hardware processor subsystem" or "hardware processor" can refer to a processor, memory (including RAM, cache(s), and so forth), software (including memory management software) or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

Figure 2:
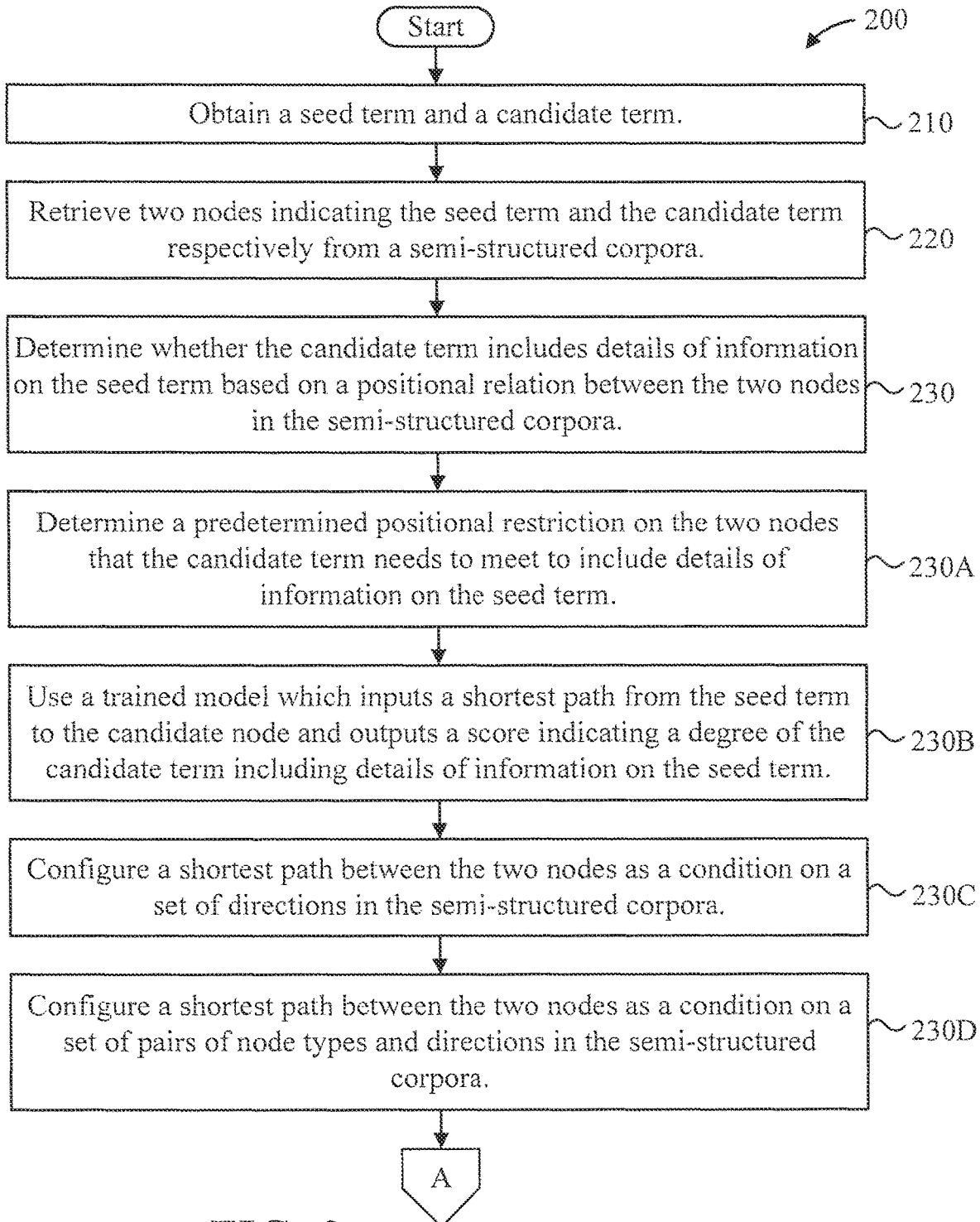
FIGS. 2-3 are flow diagrams showing an exemplary method, in accordance with an embodiment of the present invention.
Figure 3:
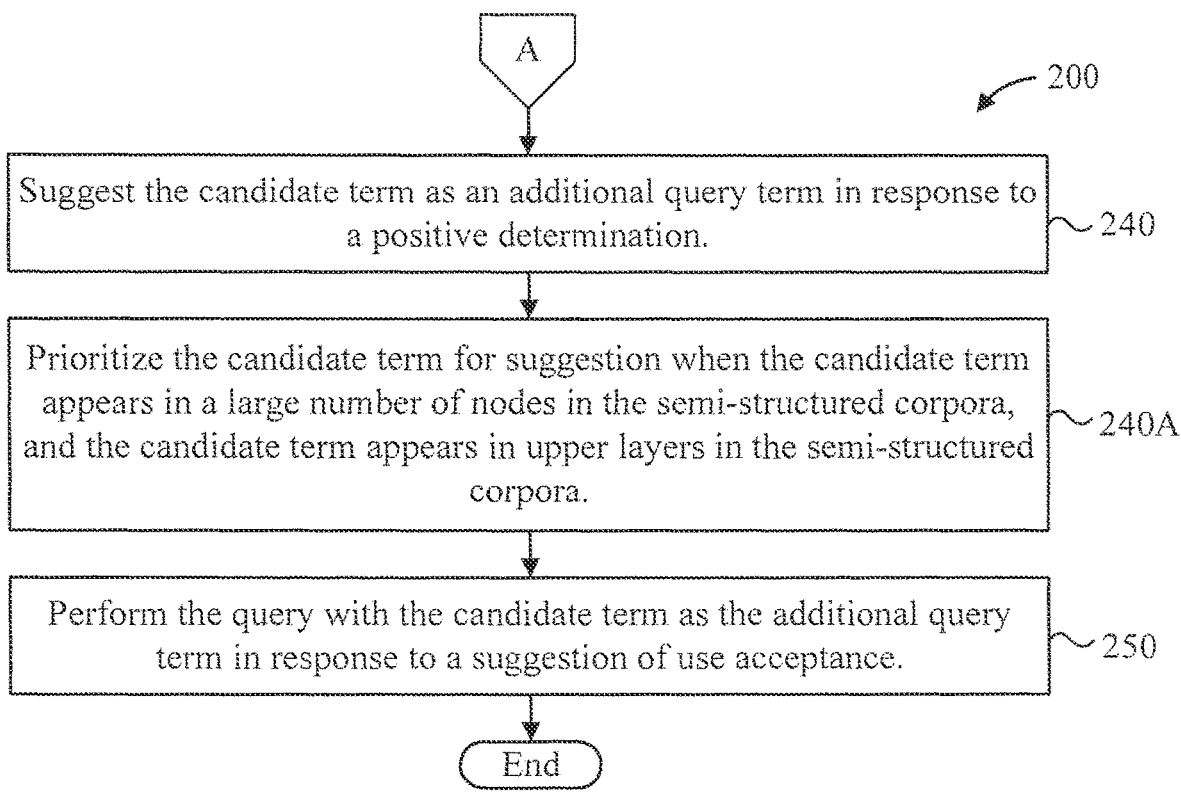

These and other variations of a hardware processor subsystem are also contemplated in accordance with embodiments of the present invention FIGS. 2-3 are flow diagrams showing an exemplary method 200, in accordance with an embodiment of the present invention.

At block 210, obtain a seed term and a candidate term.

At block 220, retrieve two nodes indicating the seed term and the candidate term respectively from a semi-structured corpora.

At block 230, determine whether the candidate term includes details of information on the seed term based on a positional relation between the two nodes in the semi-structured corpora.

In an embodiment, block 230 includes at least one or more of blocks 230A through 230D.

At block 230A, determine a predetermined positional restriction on the two nodes that the candidate term needs to meet to include details of information on the seed term.

At block 230B, use a trained model which inputs a shortest path from the seed term to the candidate node and outputs a score indicating a degree of the candidate term including details of information on the seed term.

At block 230C, configure a shortest path between the two nodes as a condition on a set of directions in the semi-structured corpora. The condition is for determining whether the candidate term includes details of information on the seed term.

At block 230D, configure a shortest path between the two nodes as a condition on a set of pairs of node types and directions in the semi-structured corpora. The condition is for determining whether the candidate term includes details of information on the seed term.

At block 240, suggest the candidate term as an additional query term in response to a positive determination.

In an embodiment, block 240 can include block 240A.

At block 240A, prioritize the candidate term for suggestion when the candidate term appears in a large number of nodes in the semi-structured corpora (e.g., exceeding 5%, although other percentages can be used depending on the domain), and the candidate term appears in upper layers in the semi-structured corpora. As an example, the upper layers can be considered being above a half-way mark in the semi-structured corpora. Such prioritization can be employed in the case of multiple candidate terms for suggestion.

At block 250, perform the query with the candidate term as the additional query term in response to a suggestion of use acceptance.

Figure 4:
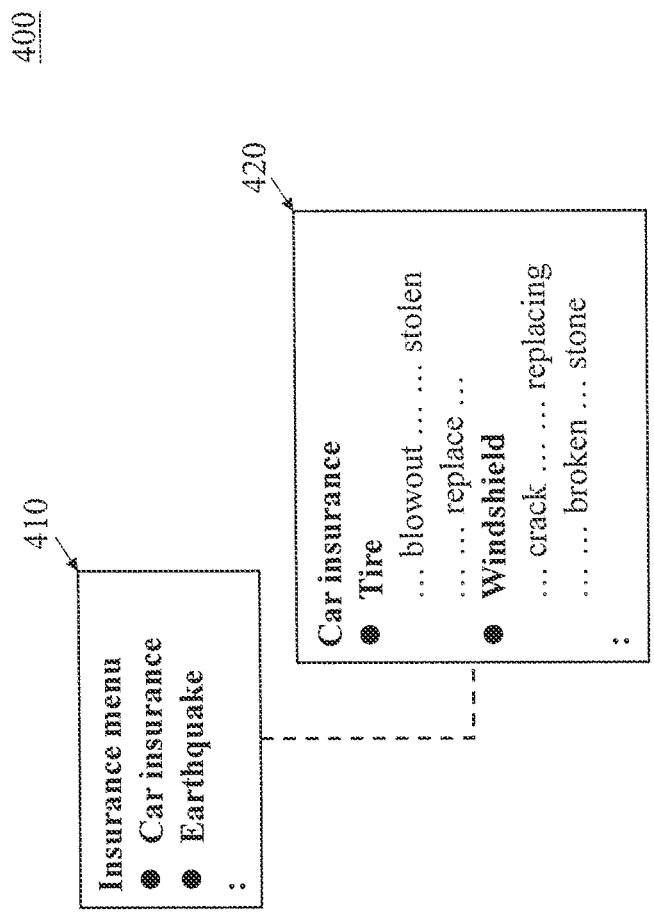
FIG. 4 is a diagram showing an exemplary portion of a corpus tree, in accordance with an embodiment of the present invention.

FIG. 4 is a diagram showing an exemplary portion 400 of a corpus tree, in accordance with an embodiment of the present invention.

The portion 400 includes a first node 410 corresponding to an insurance menu, and a second node 420 corresponding to car insurance. The criteria for a relationship is being a sub-node.

The following examples are unsatisfactory relationship-wise between the two nodes:
windshield→car insurance (NO GOOD);
replace→windshield (NO GOOD);

The following example is for a satisfactory relationship (sub-node) between the two nodes:
windshield→crack (GOOD).

Figure 5:
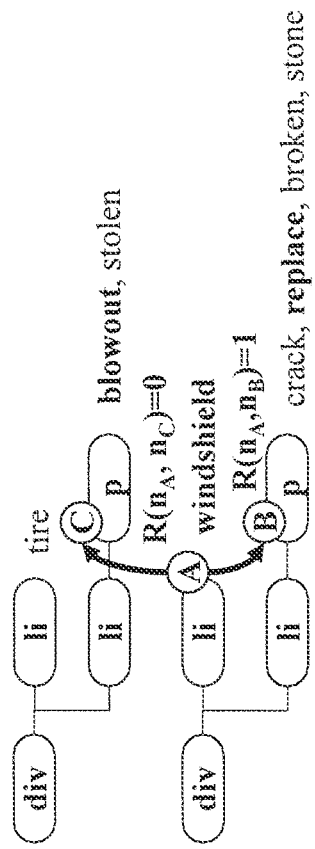
FIG. 5 is a diagram showing an exemplary corpus tree, in accordance with an embodiment of the present invention.

FIG. 5 is a diagram showing an exemplary corpus tree 500, in accordance with an embodiment of the present invention.

An encircled A denotes "windshield". An encircled B denotes "replace". An encircled C denotes "blowout". In the tree 500, "div" denotes a parent node, and "li" denotes a child node.

$$R(n_A, n_C) = 0$$

$$R(n_A, n_B) = 1$$

It is to be appreciated that R can be configured to prohibit backward suggestion.

R should be configured so that it becomes high if $n_B$ is considered to include details of the information in $n_A$. As an example, $n_A$ can be a caption, and $n_B$ can be content.

A description will now be given regarding a simple implementation version, in accordance with an embodiment of the present invention.

In the simple implementation version, R=1 if and only if $n_B$ is a descendant of $n_A$.

Such an approach is applicable to some Extensible Markup Language (XML) files, but not completely capable of representing structures in Hyper-Text Markup Language (HTML)

A description will now be given regarding a flexible implementation version, in accordance with an embodiment of the present invention.

In the flexible implementation version, R is configured by a restriction on the shortest path from $n_A$ to $n_B$.

Such an approach is applicable to cases where semantic dependency is not represented by an ancestor-descendant pair.

The following is an example definition of R by the shortest path:
R=1 if B is within a path from A by moving
(path 1) up to the nearest ancestor of li/p
(path 2) forward siblings of at most one li/p, or
(path 3) down to 10-depth descendants,
Otherwise, R=0.

These three paths are shown illustratively in FIG. 5.

Figure 6:
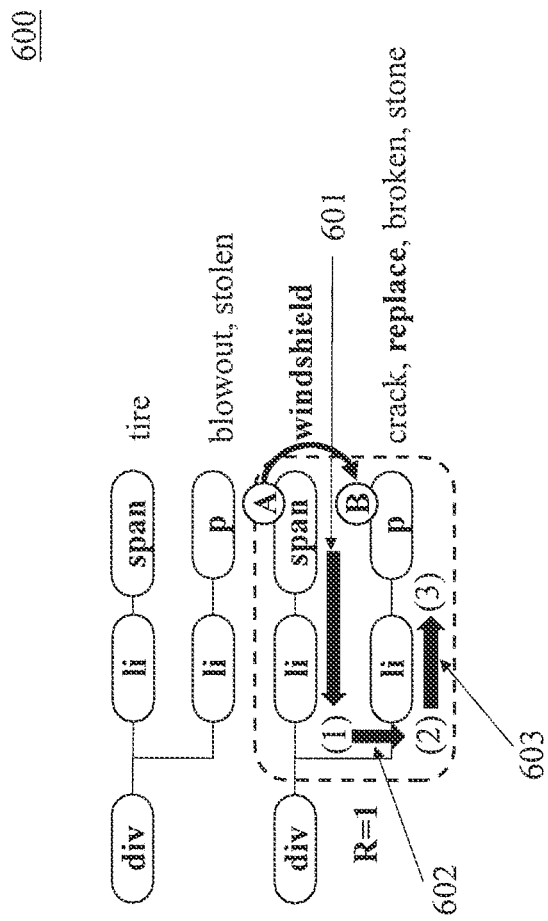
FIG. 6 is a diagram showing an exemplary portion of a corpus tree, in accordance with an embodiment of the present invention.

FIG. 6 is a diagram showing an exemplary portion 600 of a corpus tree, in accordance with an embodiment of the present invention. Portion 600 illustratively shows path 1 601, path 2 602, and path 3 603.

Figure 7:
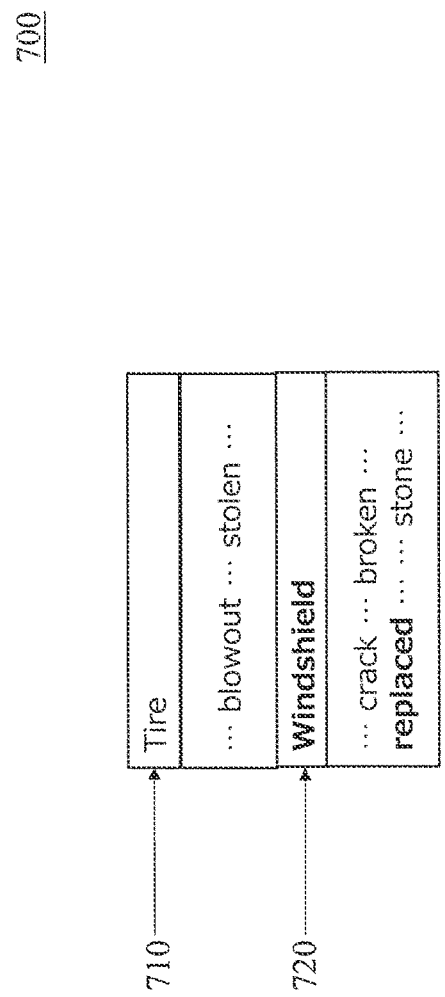
FIG. 7 is a diagram showing an exemplary portion of a corpus tree, in accordance with an embodiment of the present invention.

FIG. 7 is a diagram showing an exemplary portion 700 of a corpus tree, in accordance with an embodiment of the present invention.

The portion 700 includes a tire node 710 and windshield node 720. The tire node 710 includes children nodes "blowout" and "stolen". The windshield node 720 includes children nodes "crack", "broken", "replaced", and "stone".

Visually in portion 700, "replaced" looks like a child of "windshield" 720.

FIG. 8 is a diagram showing an exemplary portion 800 of HTML code, in accordance with an embodiment of the present invention.

In contrast to the portion 700 of a corpus tree of FIG. 7, the portion 800 of the HTML code shows that "replaced" does not belong to a child node of "windshield".

A description will now be given regarding learning R, in accordance with an embodiment of the present invention.

R can be automatically configured by learning the shortest path between the nodes including terms in a search log record as a positive sample of positional relationship.

For each record in the search log:
(1) Obtain the nodes in the semi-structured corpus including each term in the record. Example, the nodes including "windshield" and the nodes including "replaced".
(2) For each pair of a node A including a term and a node B including another term:
(2A) Create features in (node type, direction) form according to the nodes on the shortest path from A to B; and
(2B) Create features for negative samples by adding one node outside the path to a sub-path. For example, one additional "up" movement or one additional "sibling movement" can be added.

Figure 9:
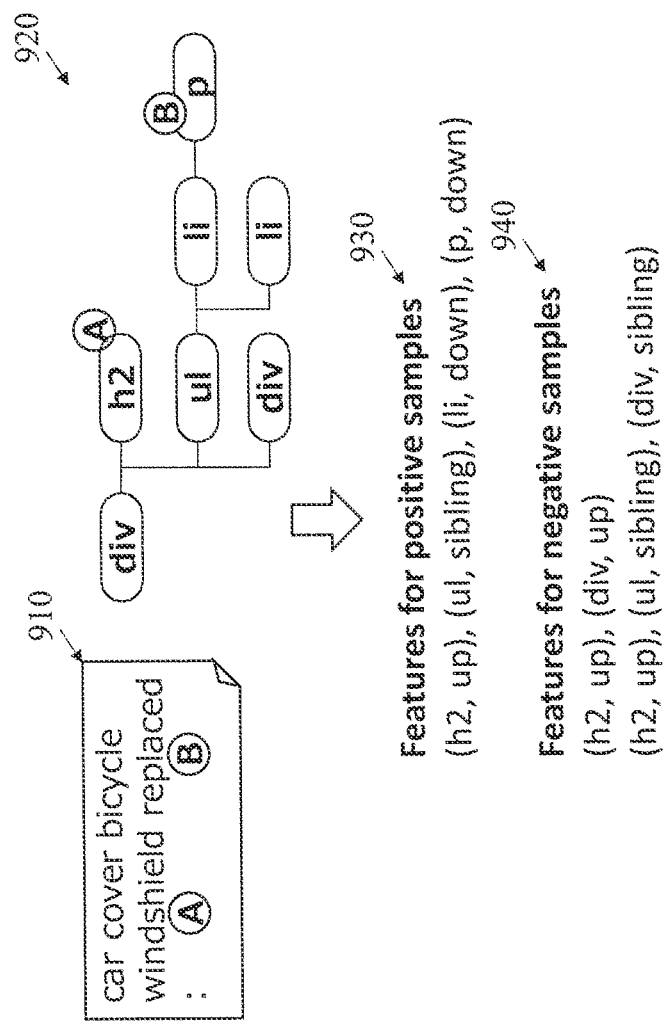
FIG. 9 is a diagram showing an exemplary search log, semi-structured corpus, features for positive samples, and features for negative samples, in accordance with an embodiment of the present invention.

FIG. 9 is a diagram showing an exemplary search log 910, semi-structured corpus 920, features 930 for positive samples, and features 940 for negative samples, in accordance with an embodiment of the present invention.

The search log 910 include nodes with terms "car", "cover", "bicycle" on one line/level, and "windshield" and "replaced" on the next line/level.

In the semi-structured corpus 920, an encircled "A" denotes "windshield", and an encircled "B" denotes "replaced".

Regarding node types in the semi-structured corpus 920:
"div" denotes a "div" tag representing a box area in an HTML file;
"h2" denotes a "h2" tag representing a second level headline in an HTML file;
"ul" denotes a "ul" tag representing an unordered list in an HTML file;
"li" denotes a "li" tag representing an item in an unordered list in an HTML file; and
"p" denotes a "p" tag representing a paragraph in an HTML file.

From the semi-structured corpus 920, features for positive samples include:
(h2, up), (ul, sibling), (li, down), (p, down).

From the semi-structured corpus 920, features for negative samples include:
(h2, up), (div, up)
(h2, up), (ul, sibling), (div, sibling).

The following options can be employed, depending upon the implementation:
(1) features may include a count. For example, (div, up, 1), (div, up, 2).
(2) The nodes in the sub-path can be excluded from the negative samples. For example, (div, up).

In an embodiment, one or more blocks of the method 200 of FIG. 2 can be performed in the cloud.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
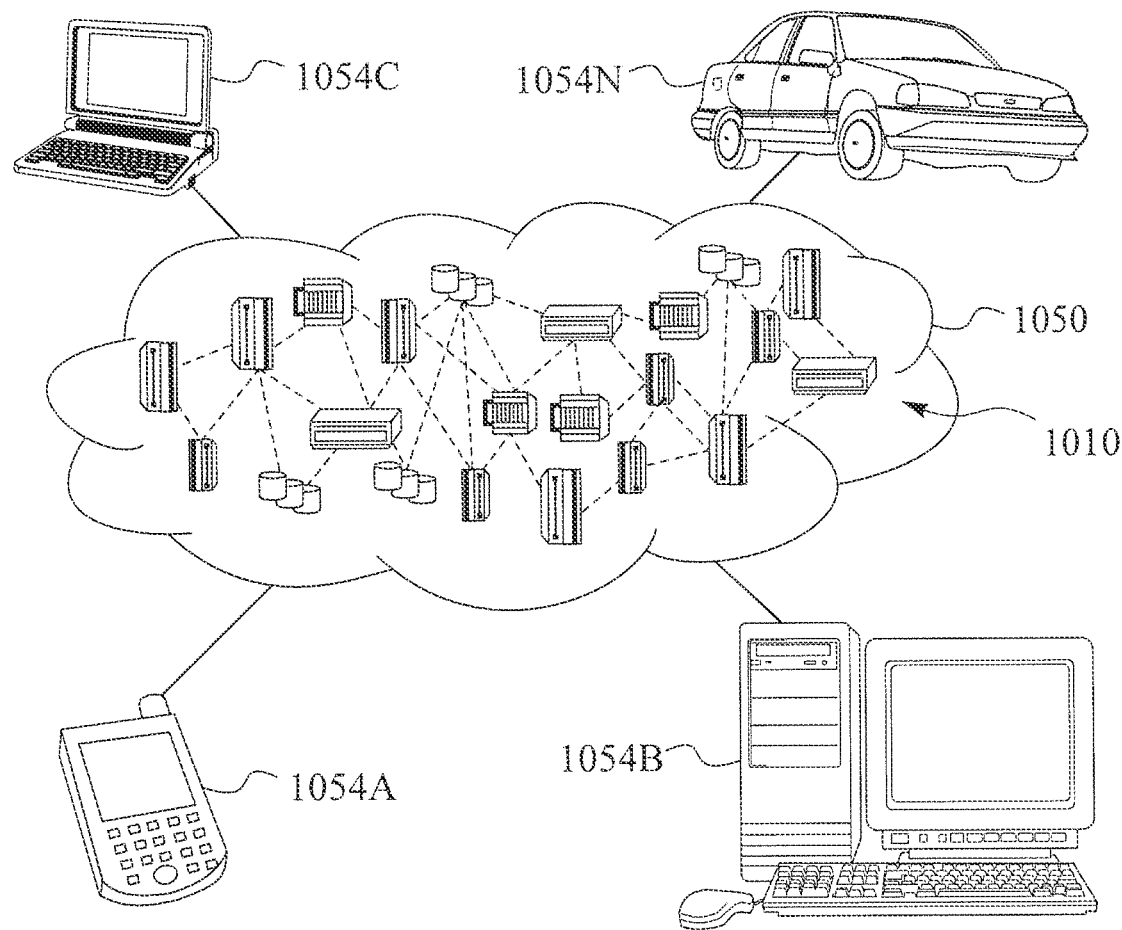
FIG. 10 is a block diagram showing an illustrative cloud computing environment having one or more cloud computing nodes with which local computing devices used by cloud consumers communicate, in accordance with an embodiment of the present invention.

Referring now to FIG. 10 illustrative cloud computing environment 1050 is depicted. As shown, cloud computing environment 1050 includes one or more cloud computing nodes 1010 with which local computing devices used by cloud consumers, such as, for example, personal digital assistant (PDA) or cellular telephone 1054A, desktop computer 1054B, laptop computer 1054C, and/or automobile computer system 1054N may communicate. Nodes 1010 may communicate with one another. They may be grouped (not shown) physically or virtually, in one or more networks, such as Private, Community, Public, or Hybrid clouds as described hereinabove, or a combination thereof. This allows cloud computing environment 1050 to offer infrastructure, platforms and/or software as services for which a cloud consumer does not need to maintain resources on a local computing device. It is understood that the types of computing devices 1054A-N shown in FIG. 10 are intended to be illustrative only and that computing nodes 1010 and cloud computing environment 1050 can communicate with any type of computerized device over any type of network and/or network addressable connection (e.g., using a web browser).

Figure 11:
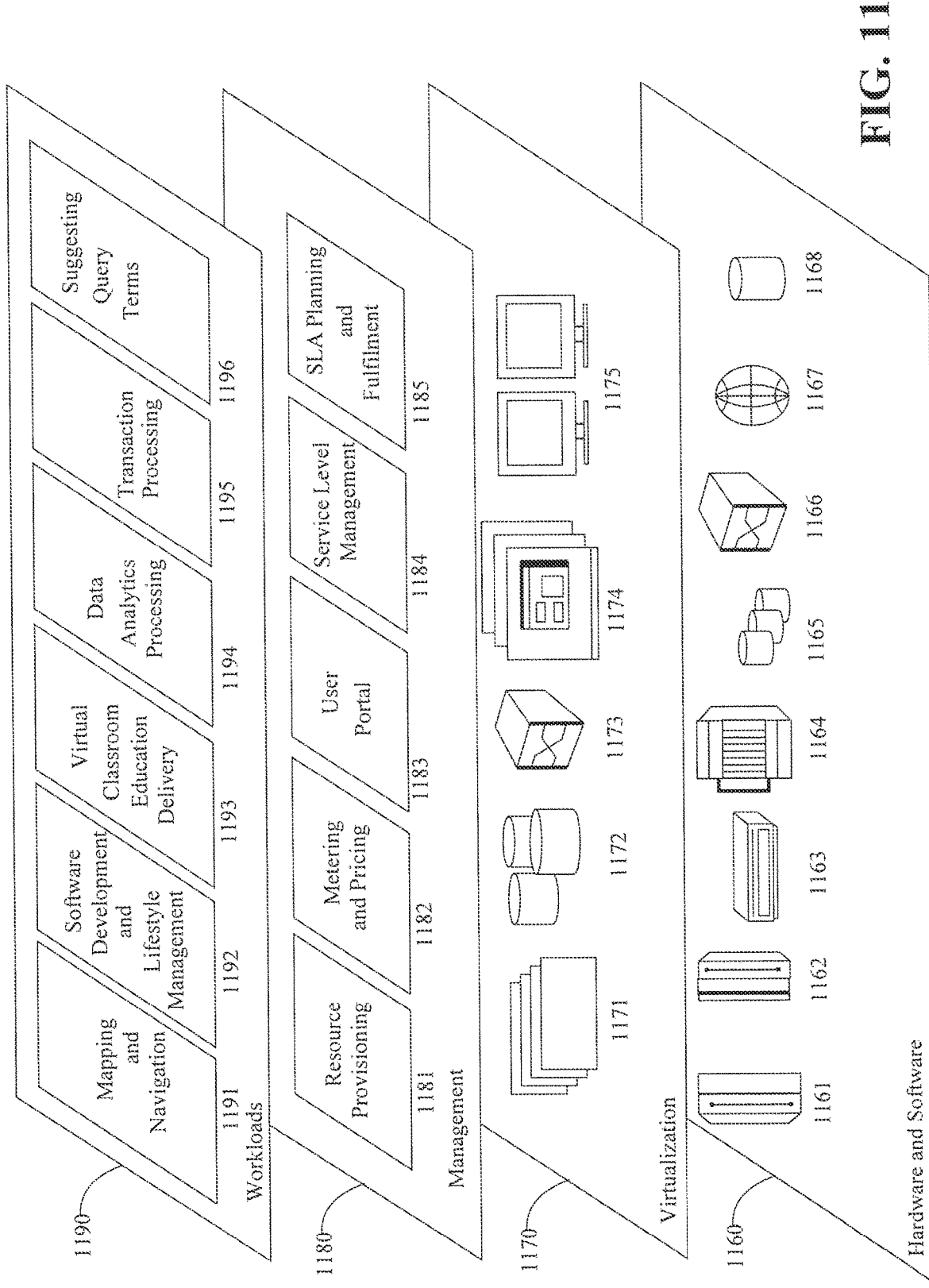
FIG. 11 is a block diagram showing a set of functional abstraction layers provided by a cloud computing environment, in accordance with an embodiment of the present invention.

Referring now to FIG. 11, a set of functional abstraction layers provided by cloud computing environment 1050 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 1160 includes hardware and software components. Examples of hardware components include: mainframes 1161; RISC (Reduced Instruction Set Computer) architecture based servers 1162; servers 1163; blade servers 1164; storage devices 1165; and networks and networking components 1166. In some embodiments, software components include network application server software 1167 and database software 1168.

Virtualization layer 1170 provides an abstraction layer from which the following examples of virtual entities may be provided: virtual servers 1171; virtual storage 1172; virtual networks 1173, including virtual private networks; virtual applications and operating systems 1174; and virtual clients 1175.

In one example, management layer 1180 may provide the functions described below. Resource provisioning 1181 provides dynamic procurement of computing resources and other resources that are utilized to perform tasks within the cloud computing environment. Metering and Pricing 1182 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1183 provides access to the cloud computing environment for consumers and system administrators. Service level management 1184 provides cloud computing resource allocation and management such that required service levels are met. Service Level Agreement (SLA) planning and fulfillment 1185 provide pre-arrangement for, and procurement of, cloud computing resources for which a future requirement is anticipated in accordance with an SLA.

Workloads layer 1190 provides examples of functionality for which the cloud computing environment may be utilized. Examples of workloads and functions which may be provided from this layer include: mapping and navigation 1191; software development and lifecycle management 1192; virtual classroom education delivery 1193; data analytics processing 1194; transaction processing 1195; and suggesting query terms 1196.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method for suggesting a query term, comprising:
   obtaining a seed term and a candidate term;

retrieving two nodes indicating the seed term and the candidate term respectively from a semi-structured corpora, having a hierarchical structure of nodes grouped based on positional information that includes relationships between nodes based on syntax of the semi-structured corpora;

determining, by a processor device, whether the candidate term includes details of information on the seed term based on a positional relation that includes an order based on positional information between the two nodes in the semi-structured corpora;

suggesting the candidate term as an additional query term in response to a positive determination; and performing the query with the candidate term as the additional query term in response to a suggestion of use that has been accepted by a user to enhance query answer retrieval results.

2. The computer-implemented method of claim 1, wherein the determining step includes determining a predetermined positional restriction on the two nodes that the candidate term needs to meet to include details of information on the seed term.

3. The computer-implemented method of claim 2, wherein the determining step includes using a trained model which inputs a shortest path from the seed term to the candidate node and outputs a score indicating a degree of the candidate term including details of information on the seed term.

4. The computer-implemented method of claim 1, wherein the seed term is comprised in a query to which the candidate term is added in response to the suggestion of use that has been accepted by a user.

5. The computer-implemented method of claim 1, wherein the candidate term is determined to include details of information on the seed term when the candidate term appears in a descendant node of a given one of the two nodes including the query term.

6. The computer-implemented method of claim 1, wherein a shortest path between the two nodes is configured as a condition on a set of node types in the semi-structured corpora, the condition for determining whether the candidate term includes details of information on the seed term.

7. The computer-implemented method of claim 1, wherein a shortest path between the two nodes is configured as a condition on a set of directions in the semi-structured corpora, the condition for determining whether the candidate term includes details of information on the seed term.

8. The computer-implemented method of claim 1, wherein a shortest path between the two nodes is configured as a condition for determining whether the candidate term includes details of information on the seed term on a set of pairs of node types and directions in the semi-structured corpora, the condition for determining whether the candidate term includes details of information on the seed term.

9. The computer-implemented method of claim 1, wherein the candidate term is prioritized for suggestion when the candidate term appears in a number of nodes in the semi-structured corpora exceeding 5% of the total number of nodes, and the candidate term appears in upper layers in the semi-structured corpora, the upper layers being above a half-way mark of the structure in the semi-structured corpora.

10. The computer-implemented method of claim 1, wherein parameters for prioritizing a suggestion of the candidate word over other candidate words having a non-shortest path to the seed word are learned by learning a shortest path between the seed term and the candidate term in the semi-structured corpora.

11. The computer-implemented method of claim 10, wherein positive samples for the learning are used as well as negative samples, the positive samples having the shortest path, the negative samples being modified positive samples adding to an existing path to elongate the existing path to the non-shortest path.

12. A computer program product for suggesting a query term, the computer program product comprising a non-transitory computer readable storage medium having program instructions embodied therewith, the program instructions executable by a computer to cause the computer to perform a method comprising:

obtaining, by a processor device, a seed term and a candidate term;

retrieving, by the processor device, two nodes indicating the seed term and the candidate term respectively from a semi-structured corpora, having a hierarchical structure of nodes grouped based on positional information that includes relationships between nodes based on syntax of the semi-structured corpora;

determining, by the processor device, whether the candidate term includes details of information on the seed term based on a positional relation that includes an order based on positional information between the two nodes in the semi-structured corpora;

suggesting, by the processor device, the candidate term as an additional query term in response to a positive determination; and performing, by the processor device, the query with the candidate term as the additional query term in response to a suggestion of use that has been accepted by a user to enhance query answer retrieval results.

13. The computer program product of claim 12, wherein the determining step includes determining a predetermined positional restriction on the two nodes that the candidate term needs to meet to include details of information on the seed term.

14. The computer program product of claim 13, wherein the determining step includes using a trained model which inputs a shortest path from the seed term to the candidate node and outputs a score indicating a degree of the candidate term including details of information on the seed term.

15. The computer program product of claim 12, wherein the seed term is comprised in a query to which the candidate term is added in response to the suggestion of use that has been accepted by a user.

16. The computer program product of claim 12, wherein the candidate term is determined to include details of information on the seed term when the candidate term appears in a descendant node of a given one of the two nodes including the query term.

17. The computer program product of claim 12, wherein a shortest path between the two nodes is configured as a condition on a set of node types in the semi-structured corpora, the condition for determining whether the candidate term includes details of information on the seed term.

18. The computer program product of claim 12, wherein a shortest path between the two nodes is configured as a condition on a set of directions in the semi-structured corpora, the condition for determining whether the candidate term includes details of information on the seed term.

19. The computer program product of claim 12, wherein a shortest path between the two nodes is configured as a condition on a set of pairs of node types and directions in the semi-structured corpora, the condition for determining whether the candidate term includes details of information on the seed term.

20. A computer processing system for suggesting a query term, comprising:
- a memory device for storing program code; and
- a processor device operatively coupled to the memory device for storing program code to:
- obtain a seed term and a candidate term;
- retrieve two nodes indicating the seed term and the candidate term respectively from a semi-structured corpora, having a hierarchical structure of nodes grouped based on positional information that includes relationships between nodes based on syntax of the semi-structured corpora;
- determine whether the candidate term includes details of information on the seed term based on a positional relation that includes an order based on positional information between the two nodes in the semi-structured corpora;
- suggest the candidate term as an additional query term in response to a positive determination; and
- perform the query with the candidate term as the additional query term in response to a suggestion of use that has been accepted by a user to enhance query answer retrieval results.

* * * * *